United States Patent
Nagy et al.

(10) Patent No.: US 7,388,033 B2
(45) Date of Patent: Jun. 17, 2008

(54) AMINE-FUNCTIONALIZED POLYISOBUTYLENES FOR IMPROVED HYDROPHOBIZING MICROEMULSIONS

(75) Inventors: Andras Nagy, Akron, OH (US); Joseph P. Kennody, Akron, OH (US); Lonn L. Swinehart, Naples, FL (US)

(73) Assignee: Capital Chemical Co., North Canton, OH (US)

( * ) Notice: Subject to any disclaimer, the term of this patent is extended or adjusted under 35 U.S.C. 154(b) by 470 days.

(21) Appl. No.: 10/946,125

(22) Filed: Sep. 21, 2004

(65) Prior Publication Data

US 2006/0063844 A1   Mar. 23, 2006

(51) Int. Cl.
*B01F 3/08* (2006.01)
*C09K 3/18* (2006.01)
*C08L 65/00* (2006.01)
*C08F 10/10* (2006.01)
*C07C 217/00* (2006.01)

(52) U.S. Cl. .................. 516/67; 564/503; 564/508; 524/543; 524/555; 525/333.7

(58) Field of Classification Search ............... 516/67; 564/503, 508; 525/333.7; 524/543, 555
See application file for complete search history.

(56) References Cited

U.S. PATENT DOCUMENTS

| 2,728,684 A | 12/1955 | Darragh |
|---|---|---|
| 3,222,201 A | 12/1965 | Boyle et al. |
| 3,222,213 A | 12/1965 | Clark |
| 3,440,063 A | 4/1969 | Chestochowski et al. |
| 3,483,927 A | 12/1969 | Nimerick et al. |
| 3,493,362 A | 2/1970 | Ferm |
| 3,508,933 A | 4/1970 | Yates |
| 3,551,168 A | 12/1970 | Atherton et al. |
| 3,658,718 A | 4/1972 | Clumpner |
| 3,711,409 A | 1/1973 | Ayers et al. |
| 3,852,075 A | 12/1974 | Basadur |
| 3,968,066 A | 7/1976 | Mueller |
| 4,208,301 A | 6/1980 | Gammon |
| 4,547,401 A | 10/1985 | Shore |
| 4,832,702 A | 5/1989 | Kummer et al. |
| 5,171,475 A | 12/1992 | Freiesleben |

(Continued)

OTHER PUBLICATIONS

*Silicone Specialties for Household Care*, GE Silicones, Division of General Electric Co., 260 Hudson River Rd., Waterford, NY, (Aug. 1993).

(Continued)

*Primary Examiner*—Daniel S. Metzmaier
(74) *Attorney, Agent, or Firm*—Beckingham, Doolittle & Burroughs, LLP; David J. Hrina; Brent L. Moore

(57) ABSTRACT

In one embodiment, the present invention relates to amine-functionalized polyisobutylenes. Methods for preparing the amine-functionalized polyisobutylenes are also described. Furthermore, the invention relates to microemulsion coating compositions comprising the amine-functionalized polyisobutylenes which can be applied to various surfaces, especially metallic vehicle surfaces, wherein the compositions form a protective barrier on the surface and improve the drying rate, protection and shine of the surface. The coating compositions have a long service life and withstand numerous washing cycles. Moreover, the coating compositions when applied to surfaces, hydrophobize the same and allow for easy removal of water by increasing the contact angle of water droplets and thus reducing the "footprint" thereof.

35 Claims, 4 Drawing Sheets

U.S. PATENT DOCUMENTS

| | | | |
|---|---|---|---|
| 5,221,329 | A | 6/1993 | Tarr |
| 5,391,325 | A | 2/1995 | Swenson et al. |
| 5,514,419 | A | 5/1996 | Popa et al. |
| 5,691,289 | A | 11/1997 | Purcell et al. |
| 5,695,551 | A | 12/1997 | Buckingham et al. |
| 5,827,451 | A | 10/1998 | Cummings et al. |
| 5,851,272 | A | 12/1998 | Vicenzi |
| 5,871,590 | A | 2/1999 | Hei et al. |
| 6,262,310 | B1 * | 7/2001 | Dever et al. .......... 564/477 |
| 6,462,009 | B1 | 10/2002 | Nagy et al. |
| 6,780,828 | B2 | 8/2004 | Nagy et al. |

OTHER PUBLICATIONS

*Information About Polish Ingredients*, Form No. 22-264B-90, Dow Corning Corp, (1990).

*Information About Silicone Emulsions*, Form 25-245-92, Dow Corning Corporation, (1992—month known).

*Vikopol® Epoxidized Polybutene Technical Information*, Elf Atochem, North America, Inc., Two Appletree Square, Minneapolis, MN 55425, (Jan. 1995).

*Surface Tension Methods*, Wilhelmy, L "Ueber die Abhangigkeit der Capillaritats-Constanten des Alkohols von Substanz und Gestal des Benetzten festen Korpers", Ann. Physik. 1963, 199, 177-217, month unknown.

*Quaternaries*, May 2, 1996, Tomah Products, Inc., 1012 Terra Drive, P.O. Box 388, Milton, WI 53563-0388.

*The Glycol Ethers Handbook*, Dow Corning Corporation, pp. 9-12, 1993, author and publisher unknown, month unknown.

*Actipol™ Activated Polybutene* by Amoco Chemical Company, 200 East Randolph Dr., Chicago, IL 60601, Bulletin AB-2, 1995, month unknown, pp. 1 of 1.

*APG-232D*, Technical Data Sheet, by Advanced Polymer Inc., 654 Gotham Parkway, Carlstadt, NJ 07072, 1996, month unknown, pp. 1 of 1.

Page 1 of *DCA-312 Instruction Manual*, by Cahn Instruments, Inc. 5225 Verona Rd., Bldg. #1, Madison, WI 53711, 1991, month unknown, pp. 1 of 1.

* cited by examiner

AMINE-FUNCTIONALIZED POLYISOBUTYLENES FOR IMPROVED HYDROPHOBIZING MICROEMULSIONS

FIELD OF THE INVENTION

In one embodiment, the present invention relates to amine-functionalized polyisobutylenes. Methods for preparing the amine-functionalized polyisobutylenes are also described. Furthermore, the invention relates to microemulsion coating compositions comprising the amine-functionalized polyisobutylenes which can be applied to various surfaces, especially metallic vehicle surfaces, wherein the compositions form a protective barrier on the surface and improve the drying rate, protection and shine of the surface. The coating compositions have a long service life and withstand numerous washing cycles. Moreover, the coating compositions when applied to surfaces, hydrophobize the same and allow for easy removal of water by increasing the contact angle of water droplets and thus reducing the "footprint" thereof.

BACKGROUND OF THE INVENTION

In the commercial automatic vehicle wash setting, it is desirable to apply a vehicle or automotive wash aid such as a drying agent and/or synthetic spray wax after the car is washed and rinsed. The drying agents or spray waxes are typically applied by spraying them onto the surface of the automobile during or after the rinse cycle. The drying agent-spray wax compositions electrostatically bond to the automobile surface. Depending on the hydrophobicity of the composition, the residual water which clings to the surface tends to form beads or is "beaded". Depending on the characteristics of the drying agents and/or spray wax, the water will run off the surface at a certain rate, especially if during the drying step jets of air are directed tangentially to the automobile's surface. Prior art drying agents and spray waxes typically utilize an oil based hydrophobe which tend to have poor durability and result in a greasy film which can be left on the windshield or glass surfaces of an automobile.

U.S. Pat. No. 6,462,009 to Nagy et al. relates to coating compositions which can be applied to surfaces to improve the drying rate, protection, and shine. However, Nagy et al. cannot anticipate nor teach or suggest the instant amine-functionalized polyisobutylenes or compositions including the same.

U.S. Pat. No. 5,871,590 to Hei et al. relates to a touchless car wash composition that can be made from a concentrate and diluted to use concentration using commonly available service water can comprise an ether amine or diamine in particular a fatty ether amine or diamine.

U.S. Pat. No. 5,851,272 to Vicenzi relates to an automobile spray wax composition incorporating an aromatic compound having at least one of two linear $C_8$ to $C_{20}$ alkyl substituents, and a preferred embodiment thereof including a compound identified and characterized by a CAS registry number of 68988-79-4.

U.S. Pat. No. 5,514,419 to Popa et al. relates to a method for treating and protecting a substrate, said method comprising coating the surface of said substrate with a composition comprising a blend of (a) a polydimethylsiloxane polymer having a viscosity at 25° C. of 5 to 100,000 cS; and
(b) a polyisobutylene oligomer having a number average molecular weight of 200 to 550. The treatment imparts an appearance to the surfaces of plastic, rubber or leather substrates whereby surface gloss is reportedly enhanced, but not excessively, as is the case for a comparable all-silicone treating agent.

U.S. Pat. No. 5,391,325 to Swenson et al. relates to emulsion compositions which are used as auto spray waxes or rinse or drying aids in automatic car washes. The inventive emulsion replaces mineral seal oil of prior art emulsions with more environmentally acceptable simple esters of natural fatty acids having the general structural formula:

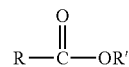

wherein R—C is from an acid moiety having approximately 12-26 carbon atoms, and R' is from an alcohol moiety having approximately 1-5 carbon atoms. In an additional embodiment, the emulsion composition can include an amine oxide coupling solvent or solubilizer.

U.S. Pat. No. 5,221,329 to Tarr relates to water repellent compositions including a silico-titanium polymer, a cationic, surface-active quaternary ammonium compound, and a spreading agent which provides odor detection properties.

U.S. Pat. No. 4,832,702 to Kummer, et al. relates to a proposed fuel or lubricant composition which contains one or more polybutyl or polyisobutylamines of the general formula:

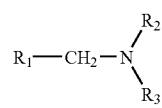

where $R_1$ is a polybutyl- or polyisobutyl radical derived from isobutene and up to 20% by weight of n-butene and $R_2$ and $R_3$ are identical or different and are each hydrogen, an aliphatic or aromatic hydrocarbon, a primary or secondary, aromatic or aliphatic aminoalkylene radical or polyaminoalkylene radical, a polyoxyalkylene radical, or a hetaryl or hetercyclyl radical, or, together with the nitrogen atom to which they are bonded, form a ring in which further hetero atoms may be present.

U.S. Pat. No. 4,547,401 to Shore is related to the cleaning of the surface of an object, such as an automobile, during which the surface is subjected to a detergent and then rinsed with water and dried by beading, an optical brightener is injected into, or contained in, the detergent and/or the rinsing water and/or the beading material. The inclusion of the optical brightener reportedly improves the appearance of the cleaned object, giving it luster and causing it to gleam, but also materially accelerates or improves the beading.

U.S. Pat. No. 4,208,301 to Gammon relates to microemulsion defoamer compositions which are oil in water colloidal dispersions reportedly useful in defoaming aqueous systems such as in paper machines and latex paints. These compositions are prepared by mixing a water dispersible organic material, ethylene oxide condensate, coupling agent, water, basic material and antigelling agent.

U.S. Pat. No. 3,852,075 to Basadur relates to a composition for reportedly improving the efficiency of automatic carwash establishments by facilitating the drying of cars and for imparting a protective coating to hard surfaces such as the exterior of cars which comprises non-volatile mineral oil, amine-functional polydimethylsiloxane (AFDS) and cationic emulsifier at critical levels and in critical proportions. A method for applying a protective coating to hard surfaces is also provided.

U.S. Pat. No. 3,711,409 to Ayres et al. relates to an ice-preventive and de-icing material for application to metallic objects, such as railway switches and the like, which is in the form of a reportedly viscous, stable, oil-in-water emulsion, comprising about 5% to 30% of the lubricant oil or grease, which is substantially insoluble in water, as the disperse phase; about 2 to 20% of a cationic or non-ionic surface active agent as an emulsifying agent; and the balance an aqueous solution, as the continuous phase, containing about 2 to 5% of the total composition of a water-absorbing, viscosity-maintaining compound and a sufficient amount of a freezing point depressant for water to lower the freezing point of the water which the composition comes into contact and thereby prevent the formation of ice on the protected object or remove ice from the protected object, provide lubrication of parts where required and prevent adhesion of parts as needed.

U.S. Pat. No. 3,658,718 to Clumpner relates to an emulsifier system for forming a stable oil and water emulsion which contains mixtures of difatty ethoxylated quaternized amidoamines in which the fatty acid residues are derived from soya and coconut oil.

U.S. Pat. No. 3,551,168 to Atherton et al. relates to a reportedly protective polish composition for auto laundries of a dicoco dimethyl quaternary amine, an ethoxylated tertiary amine and an emulsifiable mineral oil.

U.S. Pat. No. 3,508,933 to Yates relates to wax containing automobile polishes reportedly made detergent resistant by incorporating therein the reaction product of a hydroxyl endblocked polydimethylsiloxane having a viscosity in the range of 10 to 15,00 cs., and a silane selected from the group consisting of those having the general formulae $R''_n(R'O)_{3-n}Si(CH_2)_3NHR'''$ and $R''_n(R'O)_{3-n}SiRNHCH_2CH_2NH_2$ wherein R''' is a hydrogen atom or a methyl radical, R'' is a monovalent hydrocarbon radical free of aliphatic unsaturation and contains from 1 to 6 carbon atoms, n has a value of from 0 to 2, R' is an alkyl radical containing from 1 to 4 carbon atoms, and R is a divalent hydrocarbon radical free of aliphatic unsaturation and contains 3 to 4 carbon atoms, the weight ratio of the siloxane to the silane being in the range of about 1:1 to 20:1.

U.S. Pat. No. 3,440,063 to Chestochowski et al. relates to an emulsion composition for use in automatic car washes comprising a monoester ($C_6$-$C_{12}$ moieties), an acetic acid salt of a fatty amine, a hydrotrope, a short chain alcohol and water; processes for removing water from automobiles utilizing said emulsion compositions.

U.S. Pat. No. 3,222,213 to Clark relates to preparations for treating cleaned surfaces. In one aspect, this invention relates to emulsified formulations for rinsing previously cleaned automobiles.

U.S. Pat. No. 3,222,201 to Boyle et al. relates to cleaning and coating formulations. More particularly, this invention relates to oil-in-water emulsions reportedly suitable for simultaneous cleaning and coating of finished surfaces.

SUMMARY OF THE INVENTION

Amine-functionalized polyisobutylenes are described in the present invention. The amine-functionalized polyisobutylenes can be prepared utilizing a number of different methods which are also described in detail. In particular, the amine-functionalized polyisobutylenes can be prepared by first epoxidizing polyisobutylene, and subsequently reacting the epoxy functional group with excess amine to produce the amine-functionalized polyisobutylenes. In a further step, the amine-functionalized polyisobutylenes can be reacted, for example with methyl chloride.

Emulsions, in particular hydrophobizing microemulsions, are prepared utilizing the amine-functionalized polyisobutylene described herein. The emulsion compositions in addition to improving appearance of the target surface coated therewith, provide protection and allow the surfaces to dry faster. The emulsion compositions of the present invention comprise a) a hydrophobe component which always includes at least one of the amine-functionalized polyisobutylenes disclosed herein, b) an emulsifying component, c) optionally, but desirably a solvent and d) optionally, but preferably water. When applied to a surface, the compositions of the present invention cause water, such as rain water or rinse water from a carwash, to bead up and have much higher contact angles when compared to prior art compositions. The higher the contact angle, the more easily the water can be removed by running off the surface, by gravity, or by being blown off by jets of air from a commercial drier. Accordingly, it is an object of the present invention to increase the hydrophobicity of the surfaces in order to attain these objectives.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

Figure 1:
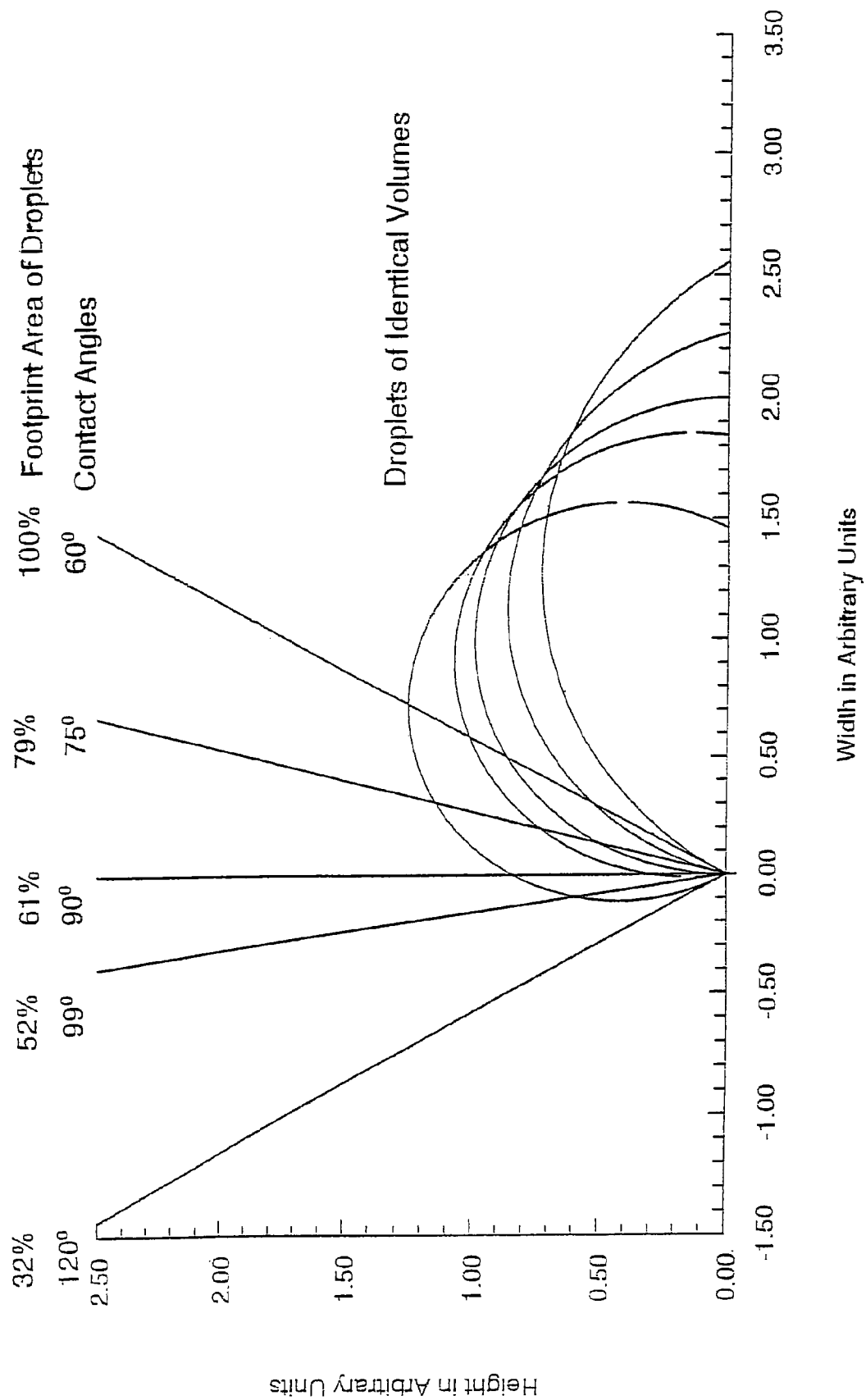
FIG. 1 illustrates the correlation between the shape of droplets and contact angles. For simplicity, the flattening effect of gravity is neglected.

The amine-functionalized polyisobutylenes of the present invention are substantially linear compounds having terminal or central amine groups and preferably short side chains. The amine-functionalized polyisobutylenes can also contain additional functional groups such as hydroxyl and methyl ether groups which can be subsequently reacted utilizing methods known in the art. The amine-functionalized polyisobutylenes or quaternary derivatives thereof generally have the following formulae:

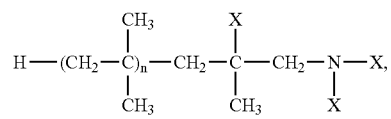

-continued

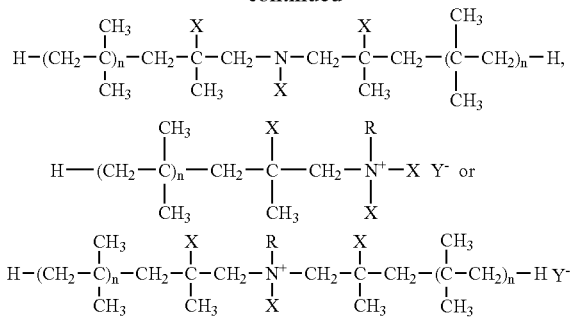

wherein each n, independently, is generally from 0 to about 100 and preferably from 1 to about 10; and wherein each X, independently, is hydrogen; a hydroxyl group; —OR' where R' is an alkyl group having from 1 to about 5 carbon atoms, with examples comprising $OCH_3$ and $OC_2H_5$, etc; an alkyl group having from 1 to about 10 carbon atoms with a methyl group being preferred; or any other functional group which can be prepared from a hydroxyl group; wherein R is an alkyl group having from 1 to about 10 carbon atoms; and wherein Y is a negatively charged ion such as chloride, bromide or iodide. The different "X" functional groups can be added during amine-functionalization of the polyisobutylene or by reacting the already formed amine-functionalized polyisobutylenes with various compounds containing the functional groups using organic chemistry techniques. In a preferred embodiment the amine-functionalized polyisobutylenes have the following formulae:

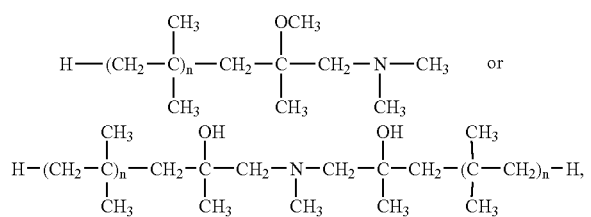

wherein each n is the same or different, and is 0 to about 100.

In order to form the amine-functionalized polyisobutylenes, one of the following procedures can be utilized. The synthesis is initiated utilizing a predetermined quantity of polyisobutylene. Preferably, the poyisobutylene has a vinylidene terminal double bond. One commercial source is sold as TPC 535 from Texas Petrochemicals. TPC 535 contains the following polyisobutylene structures:

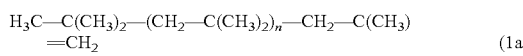
(1a)

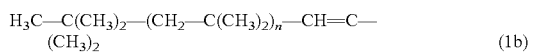
(1b)

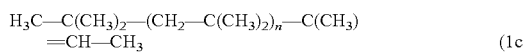
(1c)

According to Texas Petrochemicals, Formula (1a) is present in an amount of at least 80% by weight of the total mixture. The polyisobutylene of Formula (1a) is reacted in the present invention to form the amine-functionalized polyisobutylenes. Additional sources of polyisobutylenes are BP Amoco and BASF.

In a first step, the polyisobutylene is epoxidized utilizing 3-chloroperbenzoic acid and chloroform, or other agents recognized in the art as peroxidizing agents such as peroxyformic acid, peroxyacetic acid, or hydrogen peroxide. A molar excess of the 3-chloroperbenzoic acid is preferred. The reactants are heated to a temperature of about 10° C. to about 50° C., preferably about 15° C. to about 30° C. for a predetermined period of time such as about 1 to about 1000 hours, preferably about 50 to about 500 hours, preferably with agitation. The excess peracid can be destroyed such as by washing with a 10% sodium sulfite solution and extracted using 5% sodium dicarbonate with water. The epoxidized polyisobutylene can be separated and dried utilizing $MgSO_4$, and the solvent can be removed by distillation on a rotavap.

The epoxy functionalized polyisobutylene is subsequently converted to terminally and centrally or internally functionalized polyisobutylenes, for example see Formulae (3) and (4) hereinbelow. Preferably, conversion of the epoxide is performed utilizing excess amines, such as a primary or secondary amine, diamine, triamine, or polyamine, such as, but not limited to, methylamine, ethylamine, propylamine, tert-butylamine, n-butylamine, n-amylamine, dimethylamine, diethylamine, dipropylamine, cyclohexylamine, piperazine, aniline, benzylamine, ethylenediamine, diethylene triamine, or the like. The reaction is performed at pressures ranging from atmospheric up to about 50 atmospheres with 1 to about 10 atmospheres preferred. The reaction at atmospheric pressure is generally performed in a reaction vessel having a condenser, a stirring mechanism, a temperature gauge, and an addition port. Preferably the methylamine is an aqueous solution, is placed in a solvent, and is added to the reaction vessel. The epoxidized polyisobutylene is added thereto, preferably dropwise over a predetermined period of time such as about 1 hour. Ethanol is preferably utilized as a solvent. After the epoxidized polyisobutylene has been added to the reaction vessel, additional portions of aqueous methylamine can be added to the mixture, keeping the temperature at a range between about 50° C. to about 100° C., and preferably between about 60° C. to about 80° C. The reaction is carried out for about 1 to about 1000 hours, with about 50 to about 300 hours being preferred to produce the amine-functionalized polyisobutylenes, see for example Formulae (3) and (4).

For reactions greater than atmospheric pressure, a high pressure reactor is preferably utilized, such as a Parr 452 HC T316 stainless steel reactor from Parr Instrument Company, Moline, Ill., with the various amounts of epoxidized polyisobutylene and amine, e.g. aqueous methylamine solution being charged thereto. The reactor is closed, mixing initiated, and temperature raised generally to about 50° C. to about 200° C., and preferably to about 100° C. to about 150° C. The reaction is carried out from a time period generally from about 1 to about 20 days, and preferably from about 2 to about 10 days. After the desired reaction time, the reactor is cooled, the unreacted methylamine evaporated, and the amine-functionalized polyisobutylenes separated from the aqueous phase.

In a further reaction step, different functional groups can be reacted onto the amine-functionalized polyisobutylenes, such as in an alkylating process step. For example, the amine-functionalized polyisobutylene of Formula (3) is reacted with excess methyl chloride or other alkylating agent such as methyl bromide, methyl iodine, dimethyl sulfide, methyl hydrogensulfide, ethyl chloride, butyl chloride, or the like, to convert the hydroxyl functional group present to a methyl ether group, see Formula (5). In one example of this step, the high pressure reactor is preferably utilized and is charged with the amine-functionalized polyisobutylene, preferably NaHCO$_3$ neutralizing agent, and a solvent such as an isopropanol/water mixture. The mixture is cooled preferably with Dry Ice to a temperature of about −70° C. to about −15° C. and preferably from about −40° C. to about −20° C. Afterwards, a molar excess of methyl chloride is added to the mixture and the reactor closed. The temperature is raised to about 50° C. to about 200° C., and preferably to about 100° C. to about 150° C. under stirring and to about 1 to about 200 atmospheres, and preferably to about 10 to about 50 atmospheres. The reaction is maintained at the noted temperature for about 5 to about 200 hours. Afterwards, the reactor is vented, opened, the product filtered, separated, and dried producing the methyl ether functional group containing amine-functionalized polyisobutylene illustrated in Formula (5) hereinbelow.

It is believed that the reaction scheme for forming the amine-functionalized polyisobutylenes is as follows:

g (0.252 mol) of TPC-535 and 100 mL of CHCl$_3$. A solution of 48 g (0.278 mol) of m-chloroperoxybenzoic acid in 600 mL of CHCl$_3$ was then added over a period of ~30 min at 25° C. The charge was stirred for another 4 hours and transferred to a separatory funnel; the excess peracid was destroyed by washing with 200 mL of 10% sodium sulfite. The m-chlorobenzoic acid was extracted by washing three times each with 200 mL of 5% sodium bicarbonate and with distilled water. The organic layer was separated and dried with anhydrous MgSO$_4$; the solvent was removed by distillation on a rotavap. The final product was identified as Formula (2). The conversion of olefin to epoxy end functionality was followed by $^1$H-NMR spectroscopy following the 4.58 and 4.78 ppm resonances associated with the —C$\underline{H}$—C$\underline{H}_2$, respectively. Molecular weights were determined by GPC using a calibration made with narrow molecular weight distribution PIB standard. $M_n$=374, $M_w/M_n$=1.31.

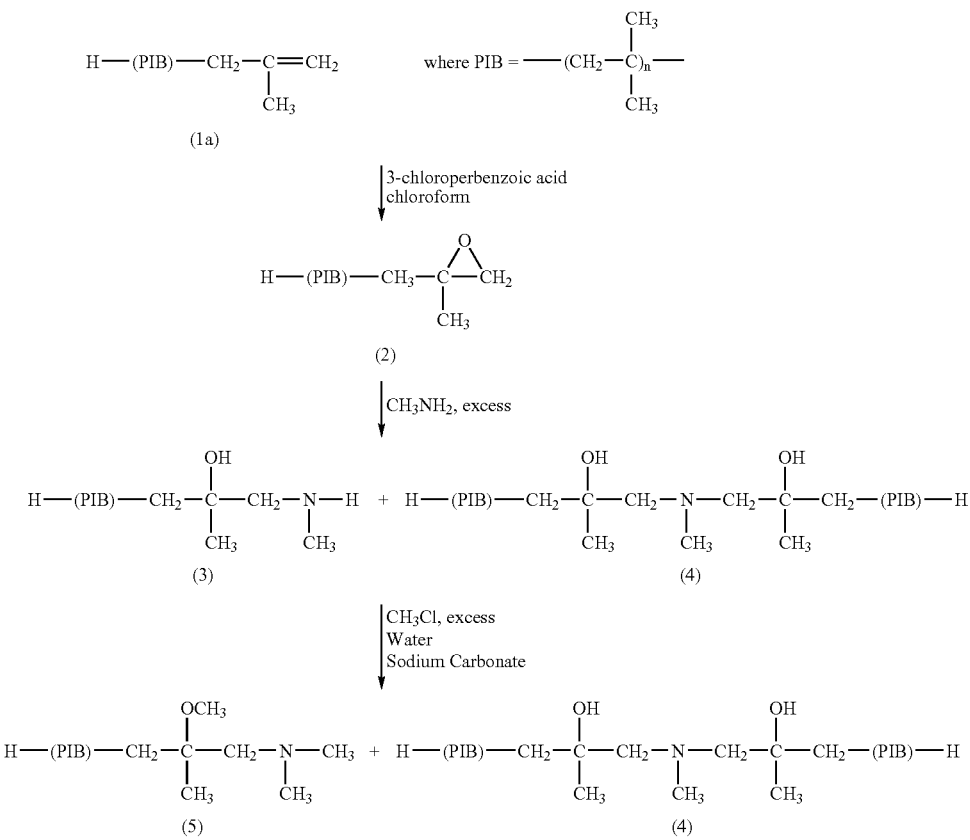

wherein n is defined hereinabove.

The following examples set forth syntheses of terminal and centrally functionalized polyisobutylenes of the present invention and serve to illustrate, but not to limit the present invention. Detailed characterization of the products by mass spectroscopy, $^1$H-NMR spectroscopy, and Gel Permeation Chromatography (GPC) are also presented.

EXAMPLE 1

A 1000-mL round bottom flask, equipped with magnetic stirrer, condenser, and dropping funnel, was charged with 91

EXAMPLE 2

A 1000-mL round bottom flask, equipped with magnetic stirrer, condenser, and dropping funnel, was charged with 90.4 g (0.249 mol) of TPC-535 and 100 mL of CHCl$_3$. A solution of 48 g (0.278 mol) of m-chloroperoxybenzoic acid in 600 mL of CHCl$_3$ was then added over a period of 30 min at 25° C. The charge was stirred for another 47 hours and transferred to a separatory funnel; the excess peracid was destroyed by washing with 200 mL of 10% sodium sulfite. The m-chlorobenzoic acid was extracted by washing three times each with 200 mL of 5% sodium bicarbonate and with distilled water. The organic layer was separated and dried with anhydrous $MgSO_4$; the solvent was removed by distillation on a rotavap. The final product was identified as Formula (2). The conversion of olefin to epoxy end functionality was followed by $^1$H-NMR spectroscopy following the 4.58 and 4.78 ppm resonances associated with the —C$\underline{H}$—C$\underline{H}_2$, respectively. Molecular weights were determined by GPC using a calibration made with narrow molecular weight distribution PIB standard. $M_n=379$, $M_w/M_n=1.35$.

EXAMPLE 3

A 1000-mL round bottom flask, equipped with magnetic stirrer, condenser, and dropping funnel, was charged with 67.0 g (0.185 mol) of TPC-535 and 100 mL of $CHCl_3$. A solution of 48 g (0.278 mol) of m-chloroperoxybenzoic acid in 500 mL of $CHCl_3$ was then added over a period of 30 min at 25° C. The charge was stirred for another 92.5 hours and transferred to a separatory funnel; the excess peracid was destroyed by washing with 200 mL of 10% sodium sulfite. The m-chlorobenzoic acid was extracted by washing three times each with 200 mL of 5% sodium bicarbonate and with distilled water. The organic layer was separated and dried with anhydrous $MgSO_4$; the solvent was removed by distillation on a rotavap. The final product was identified as Formula (2). The conversion of olefin to epoxy end functionality was followed by $^1$H-NMR spectroscopy following the 4.58 and 4.78 ppm resonances associated with the —C$\underline{H}$—C$\underline{H}_2$, respectively. Molecular weights were determined by GPC using a calibration made with narrow molecular weight distribution PIB standard. $M_n=369$, $M_w/M_n=1.35$.

EXAMPLE 4

A 1000-ml round bottom flask, equipped with magnetic stirrer, condenser, and dropping funnel, was charged with 52.0 g (0.143 mol) of TPC-535 and 100 mL of $CHCl_3$. A solution of 41 g (0.238 mol) of m-chloroperoxybenzoic acid in 400 mL of $CHCl_3$ was then added over a period of 30 min at 25° C. The charge was stirred for another 98 hours and transferred to a separatory funnel; the excess peracid was destroyed by washing with 200 mL of 10% sodium sulfite. The m-chlorobenzoic acid was extracted by washing three times each with 200 mL of 5% sodium bicarbonate and with distilled water. The organic layer was separated and dried with anhydrous $MgSO_4$; the solvent was removed by distillation on a rotavap. The final product was identified as Formula (2). The conversion of olefin to epoxy end functionality was followed by $^1$H-NMR spectroscopy following the 4.58 and 4.78 ppm resonances associated with the —C$\underline{H}$—C$\underline{H}_2$, respectively. Molecular weights were determined by GPC using a calibration made with narrow molecular weight distribution PIB standard. $M_n=374$, $M_w/M_n=1.33$.

A solution of 3.1 g of 40% aqueous methylamine (0.04 mol) in 70 mL of ethanol is heated to reflux in a reaction flask provided with dry ice condenser, stirrer, thermometer, and addition funnel. A solution of 30 g (0.08 mol) of epoxidized PIB (Formula (2)) in 60 mL of ethanol is added dropwise over a one hour period to the refluxing solution. The progress of the reaction is followed by periodically withdrawing samples form the reaction mixture and measuring the molecular weight by GPC. Additional portions of aqueous methylamine were added to the reaction mixture, while keeping the temperature between 60-80° C. After 210 hours and a total of 2.2 mol of methylamine, the $M_n=468$, $M_w/M_n=1.37$. 10 g (0.026 mole) of epoxidized PIB (Formula (2)) was added to the reaction mixture, and the reaction was carried out for another 576 hours. The final product was identified as Formulae (3) and (4). $M_n=560$, $M_w/M_n=1.39$.

EXAMPLE 5

A 1000-mL round bottom flask, equipped with magnetic stirrer, condenser, and dropping funnel, was charged with 91 g (0.252 mol) of TPC-535 and 100 mL of $CHCl_3$. A solution of 48 g (0.278 mol) of m-chloroperoxybenzoic acid in 600 mL of $CHCl_3$ was then added over a period of 30 min at 25° C. The charge was stirred for another 95 hours and transferred to a separatory funnel; the excess peracid was destroyed by washing with 200 mL of 10% sodium sulfite. The m-chlorobenzoic acid was extracted by washing three times each with 200 mL of 5% sodium bicarbonate and with distilled water. The organic layer was separated and dried with anhydrous $MgSO_4$; the solvent was removed by distillation on a rotavap. The final product was identified as Formula (2). The conversion of olefin to epoxy end functionality was followed by $^1$H-NMR spectroscopy following the 4.58 and 4.78 ppm resonances associated with the —C$\underline{H}$—C$\underline{H}_2$, respectively. Molecular weights were determined by GPC using a calibration made with narrow molecular weight distribution PIB standard. $M_n=371$, $M_w/M_n=1.25$.

EXAMPLE 6

A 1000-mL round bottom flask, equipped with magnetic stirrer, condenser, and dropping funnel, was charged with 91 g (0.252 mol) of TPC-535 and 100 mL of $CHCl_3$. A solution of 48 g (0.278 mol) of m-chloroperoxybenzoic acid in 600 mL of $CHCl_3$ was then added over a period of 30 min at 25° C. The charge was stirred for another 360 hours and transferred to a separatory funnel; the excess peracid was destroyed by washing with 200 mL of 10% sodium sulfite. The m-chlorobenzoic acid was extracted by washing three times each with 200 mL of 5% sodium bicarbonate and with distilled water. The organic layer was separated and dried with anhydrous $MgSO_4$; the solvent was removed by distillation on a rotavap. The final product was identified as Formula (2). The conversion of olefin to epoxy end functionality was followed by $^1$H-NMR spectroscopy following the 4.58 and 4.78 ppm resonances associated with the —C$\underline{H}$—C$\underline{H}_2$, respectively. Molecular weights were determined by GPC using a calibration made with narrow molecular weight distribution PIB standard. $M_n=365$, $M_w/M_n=1.33$.

A solution of 31 g of 40% aqueous methylamine (0.4 mol) and 30 g (0.08 mol) of epoxidized PIB (Formula (2)) is heated to reflux in a reaction flask provided with dry ice condenser, stirrer, and thermometer. The progress of the reaction is followed by periodically withdrawing samples form the reaction mixture and measuring the molecular weight by GPC. Additional portions of aqueous methylamine were added to the reaction mixture, while keeping the temperature between 60-80° C. After 172 hours and a total of 0.7 mol of methylamine, the $M_n=381$, $M_w/M_n=1.3$. 30 g (0.08 mole) of epoxidized PIB (Formula (2)) was added to the reaction mixture, and the reaction was carried out for another 426 hours at 80° C. The final product was identified as Formulae (3) and (4). $M_n=369$, $M_w/M_n=1.42$.

EXAMPLE 7

A 1000-mL round bottom flask, equipped with magnetic stirrer, condenser, and dropping funnel, was charged with 91 g (0.252 mol) of TPC-535 and 100 mL of $CHCl_3$. A solution of 48 g (0.278 mol) of m-chloroperoxybenzoic acid in 600 mL of CHCl$_3$ was then added over a period of 30 minutes at 25° C. The charge was stirred for another 648 hours and transferred to a separatory funnel; the excess peracid was destroyed by washing with 200 mL of 10% sodium sulfite. The m-chlorobenzoic acid was extracted by washing three times each with 200 mL of 5% sodium bicarbonate and with distilled water. The organic layer was separated and dried with anhydrous MgSO$_4$; the solvent was removed by distillation on a rotavap. The final product was identified as Formula (2). The conversion of olefin to epoxy end functionality was followed by $^1$H-NMR spectroscopy following the 4.58 and 4.78 ppm resonances associated with the —CH—CH$_2$, respectively. Molecular weights were determined by GPC using a calibration made with narrow molecular weight distribution PIB standard. $M_n$=360, $M_w/M_n$=1.33.

A 300 mL stirred Parr 452 HC T316 stainless steel reactor (Parr Instrument Company, Moline, Ill. USA) was charged with 30 g (0.08 mole) of epoxidized PIB (Formula (2)) and 100 g (1.3 mole) of methylamine in 40 wt % aqueous solution. After the reactor was closed, the stirring was started, and the temperature was raised to 121° C. The pressure in the reactor has reached 7.5 atm. The experiment was carried out for 46 hours. After the reactor cooled down and cautiously opened, the unreacted methylamine was evaporated, and the polymer was separated from the aqueous phase. The product was identified as Formulae (3) and (4). $M_n$=449, $M_w/M_n$=1.34.

The same pressure reactor was charged with 24.5 g (0.06 mole) of amine functional PIB (Formulae (3) and (4)) and 24.5 g (0.064 mole) of epoxidized PIB. After the reactor was closed, the stirring was started, and the temperature was raised to 121° C. The pressure in the reactor has reached 7.5 atm. The experiment was carried out for 48 hours. After the reactor cooled down and cautiously opened, the polymer was put in a drying oven. The product was identified as Formulae (3) and (4). $M_n$=N/A, $M_w/M_n$=N/A.

EXAMPLE 8

A 1000-mL round bottom flask, equipped with magnetic stirrer, condenser, and dropping funnel, was charged with 77 g (0.211 mol) of TPC-535 and 100 mL of CHCl$_3$. A solution of 47 g (0.272 mol) of m-chloroperoxybenzoic acid in 600 mL of CHCl$_3$ was then added over a period of 30 minutes at 25° C. The charge was stirred for another 240 hours and transferred to a separatory funnel; the excess peracid was destroyed by washing with 200 mL of 10% sodium sulfite. The m-chlorobenzoic acid was extracted by washing three times each with 200 mL of 5% sodium bicarbonate and with distilled water. The organic layer was separated and dried with anhydrous MgSO$_4$; the solvent was removed by distillation on a rotavap. The final product was identified as Formula (2). The conversion of olefin to epoxy end functionality was followed by $^1$H-NMR spectroscopy following the 4.58 and 4.78 ppm resonances associated with the —CH—CH$_2$, respectively. Molecular weights were determined by GPC using a calibration made with narrow molecular weight distribution PIB standard. $M_n$=360, $M_w/M_n$=1.33.

A 300 mL stirred Parr 452 HC T316 stainless steel reactor (Parr Instrument Company, Moline, Ill. USA) was charged with 50 g (0.13 mole) of epoxidized PIB (Formula (2)) and 5.0 g (0.065 mole) of methylamine in 40 wt % aqueous solution. After the reactor was closed, the stirring was started, and the temperature was raised to 121° C. The pressure in the reactor has reached 7.5 atm. Additional portions of aqueous methylamine were added to the reaction mixture, while keeping the temperature at 121° C. After 300 h and a total of 0.84 mol of methylamine the reactor cooled down and cautiously opened, the unreacted methylamine was evaporated, and the polymer was separated from the aqueous phase. The product was identified as Formulae (3) and (4). $M_n$=381, $M_w/M_n$=1.38.

The same pressure reactor was charged with 49.5 g (0.13 mole) of amine functional PIB (Formulae (3) and (4)) and 15.5 g (0.037 mole) of epoxidized PIB (Formula (2). After the reactor was closed, the stirring was started, and the temperature was raised to 121° C. The pressure in the reactor has reached 7.5 atm. The experiment was carried out for 428 h. After the reactor cooled down and cautiously opened, the polymer was put in a drying oven. The product was identified as Formulae (3) and (4). $M_n$=415, $M_w/M_n$=1.44.

EXAMPLE 9

A 1000-mL round bottom flask, equipped with magnetic stirrer, condenser, and dropping funnel, was charged with 91 g (0.252 mol) of TPC-535 and 100 mL of CHCl$_3$. A solution of 53 g (0.307 mol) of m-chloroperoxybenzoic acid in 650 mL of CHCl$_3$ was then added over a period of 30 minutes at 25° C. The charge was stirred for another 200 hours and transferred to a separatory funnel; the excess peracid was destroyed by washing with 200 mL of 10% sodium sulfite. The m-chlorobenzoic acid was extracted by washing three times each with 200 mL of 5% sodium bicarbonate and with distilled water. The organic layer was separated and dried with anhydrous MgSO$_4$; the solvent was removed by distillation on a rotavap. The final product was identified as (Formula (2)). The conversion of olefin to epoxy end functionality was followed by $^1$H-NMR spectroscopy following the 4.58 and 4.78 ppm resonances associated with the —CH—CH$_2$, respectively. Molecular weights were determined by GPC using a calibration made with narrow molecular weight distribution PIB standard. $M_n$=355, $M_w/M_n$=1.34.

A 300 mL stirred Parr 452 HC T316 stainless steel reactor (Parr Instrument Company, Moline, Ill. USA) was charged with 30 g (0.08 mole) of epoxidized PIB (Formula (2)) and 75.0 g (0.96 mole) of methylamine in 40 wt % aqueous solution. After the reactor was closed, the stirring was started, and the temperature was raised to 121° C. The pressure in the reactor has reached 7.5 atm. The experiment was carried out for 100 h. After the reactor cooled down and cautiously opened, the unreacted methylamine was evaporated, and the polymer was separated from the aqueous phase. The product was identified as (Formulae (3) and (4). $M_n$=381, $M_w/M_n$=1.38.

The same pressure reactor was charged with 27.5 g (0.067 mole) of amine functional PIB (Formulae (3) and (4)) and 25 g (0.066 mole) of epoxidized PIB (Formula (2)). After the reactor was closed, the stirring was started, and the temperature was raised to 121° C. The pressure in the reactor has reached 7.5 atm. The experiment was carried out for 1076 h. After the reactor cooled down and cautiously opened, the polymer was put in a drying oven. The product was identified as Formulae (3) and (4). $M_n$=484, $M_w/M_n$=1.33.

The above mentioned Parr reactor was charged with 0.06-0.07 moles of amine-functionalized PIB (Formulae (3) and (4)), 10 grams of NaHCO$_3$ as a proton trap, and 100 mL of isopropanol/water mixture as solvent. The mixture was cooled down with Dry Ice, and 52 g (1.03 mol) of CH$_3$Cl was added at −30° C. to the mixture. The reactor was quickly closed, and the temperature was raised to 120° C., while the pressure increased to 34 atm. During intense stirring, the reactor was kept at 120° C. for 72 hours. After the reactor was vented, and opened, the product was filtered, separated and dried before Mass Spectrometry Characterization. The product was identified as Formulae (5) and (4). The following table sets forth the characterization of the final product by the use of elemental analysis and GPC:

| Formula | Final composition (moles) | Final composition (mole %) | $M_n$ | Final composition (w %) |
|---|---|---|---|---|
| (1a) | 0 | 0 | 365 | 0 |
| (1b) + (1c) | 20 | 28.6 | 365 | 18.5 |
| (2) | 0 | 0 | 381 | 0 |
| (3) | 0 | 0 | 408 | 0 |
| (4) | 30 | 42.8 | 791 | 60.2 |
| (5) | 20 | 28.6 | 420 | 21.3 |

It is noted that Formulae (1b) and (1c) do not take part in the reaction and thus all 20 moles of (1b) and (1c) starting material are present in the final composition in original form. 20 moles of Formula (5) and 30 moles of Formula (4) were also present in the final mixture. It was determined that all starting material Formula (1a) was converted to either Formulae (4) or (5). Also, no intermediate products were present. Of course, it is to be understood that the composition of the amine-functionalized polyisobutylenes will vary depending upon the starting materials utilized as described hereinabove.

EXAMPLE 10

A 1000-mL round bottom flask, equipped with magnetic stirrer, condenser, and dropping funnel, was charged with 82 g (0.225 mol) of TPC-535 and 100 mL of $CHCl_3$. A solution of 48 g (0.278 mol) of m-chloroperoxybenzoic acid in 600 mL of $CHCl_3$ was then added over a period of 30 minutes at 25° C. The charge was stirred for another 168 hours and transferred to a separatory funnel; the excess peracid was destroyed by washing with 200 mL of 10% sodium sulfite. The m-chlorobenzoic acid was extracted by washing three times each with 200 mL of 5% sodium bicarbonate and with distilled water. The organic layer was separated and dried with anhydrous $MgSO_4$; the solvent was removed by distillation on a rotavap. The final product was identified as Formula (2). The conversion of olefin to epoxy end functionality was followed by $^1$H-NMR spectroscopy following the 4.58 and 4.78 ppm resonances associated with the —C$\underline{H}$—C$\underline{H}_2$, respectively. Molecular weights were determined by GPC using a calibration made with narrow molecular weight distribution PIB standard. $M_n$=354, $M_w/M_n$=1.34.

A 300 mL stirred Parr 452 HC T316 stainless steel reactor (Parr Instrument Company, Moline, Ill. USA) was charged with 30 g (0.083 mole) of epoxidized PIB (Formula (2) and 75.0 g (0.99 mole) of methylamine in 40 wt % aqueous solution. After the reactor was closed, the stirring was started, and the temperature was raised to 120° C. The pressure in the reactor has reached 7.5 atm. The experiment was carried out for 240 hours. After the reactor cooled down and cautiously opened, the unreacted methylamine was evaporated, and the polymer was separated from the aqueous phase. The product was identified as Formulae (3) and (4). $M_n$=392, $M_w/M_n$=1.62.

The above mentioned Parr reactor was charged with 0.083 moles of amine-functionalized PIB (Formulae (3) and (4)), 10 grams of $NaHCO_3$ as a proton trap, and 100 mL of isopropanol/water mixture as solvent. The mixture was cooled down with Dry Ice, and 52 g (1.03 mol) of $CH_3Cl$ was added at −30° C. to the mixture. The reactor was quickly closed, and the temperature was raised to 118° C., while the pressure increased to 46 atm. During intense stirring, the reactor was kept at 118° C. for 72 hours. After the reactor was vented, and opened, the product was filtered, separated and dried. The product was identified as Formulae (5) and (4).

EXAMPLE 11

A 1000-mL round bottom flask, equipped with magnetic stirrer, condenser, and dropping funnel, was charged with 91 g (0.252 mol) of TPC-535 and 100 mL of $CHCl_3$. A solution of 48 g (0.278 mol) of m-chloroperoxybenzoic acid in 600 mL of $CHCl_3$ was then added over a period of 30 minutes at 25° C. The charge was stirred for another 480 hours and transferred to a separatory funnel; the excess peracid was destroyed by washing with 200 mL of 10% sodium sulfite. The m-chlorobenzoic acid was extracted by washing three times each with 200 mL of 5% sodium bicarbonate and with distilled water. The organic layer was separated and dried with anhydrous $MgSO_4$; the solvent was removed by distillation on a rotavap. The final product was identified as Formula (2). The conversion of olefin to epoxy end functionality was followed by $^1$H-NMR spectroscopy following the 4.58 and 4.78 ppm resonances associated with the —C$\underline{H}$—C$\underline{H}_2$, respectively. Molecular weights were determined by GPC using a calibration made with narrow molecular weight distribution PIB standard. $M_n$=356, $M_w/M_n$=1.32.

A 300 mL stirred Parr 452 HC T316 stainless steel reactor (Parr Instrument Company, Moline, Ill. USA) was charged with 30 g (0.08 mole) of epoxidized PIB (Formula (2)) and 75.0 g (0.96 mole) of methylamine in 40 wt % aqueous solution. After the reactor was closed, the stirring was started, and the temperature was raised to 120° C. The pressure in the reactor has reached 7.5 atm. The experiment was carried out for 213 h. After the reactor cooled down and cautiously opened, the unreacted methylamine was evaporated, and the polymer was separated from the aqueous phase. The product was identified as Formulae (3) and (4).

EXAMPLE 12

A 1000-mL round bottom flask, equipped with magnetic stirrer, condenser, and dropping funnel, was charged with 77 g (0.211 mol) of TPC-535 and 100 mL of $CHCl_3$. A solution of 47 g (0.272 mol) of m-chloroperoxybenzoic acid in 600 mL of $CHCl_3$ was then added over a period of 30 minutes at 25° C. The charge was stirred for a few days and transferred to a separatory funnel; the excess peracid was destroyed by washing with 200 mL of 10% sodium sulfite. The m-chlorobenzoic acid was extracted by washing three times each with 200 mL of 5% sodium bicarbonate and with distilled water. The organic layer was separated and dried with anhydrous $MgSO_4$; the solvent was removed by distillation on a rotavap. The final product was identified as Formula (2). The conversion of olefin to epoxy end functionality was followed by $^1$H-NMR spectroscopy following the 4.58 and 4.78 ppm resonances associated with the —C$\underline{H}$—C$\underline{H}_2$, respectively. Molecular weights were determined by GPC using a calibration made with narrow molecular weight distribution PIB standard. $M_n$=356, $M_w/M_n$=1.33.

A 300 mL stirred Parr 452 HC T316 stainless steel reactor (Parr Instrument Company, Moline, Ill. USA) was charged with 30 g (0.08 mole) of epoxidized PIB (Formula (2)) and 75.0 g (0.96 mole) of methylamine in 40 wt % aqueous solution. After the reactor was closed, the stirring was started, and the temperature was raised to 120° C. The pressure in the reactor has reached 7.5 atm. The experiment was carried out for 96 hours. After the reactor cooled down and cautiously opened, the unreacted methylamine was evaporated, and the polymer was separated from the aqueous phase. The product was identified as Formulae (3) and (4).

The same pressure reactor was charged with 0.069 moles of amine functional PIB (Formulae (3) and (4) and 30 g (0.08 mole) of epoxidized PIB (Formula (2)). After the reactor was closed, the stirring was started, and the temperature was raised to 120° C. The pressure in the reactor has reached 7.5 atm. The experiment was carried out for 860 hours. After the reactor cooled down and cautiously opened, the polymer was put in a drying oven. The product was identified as Formulae (3) and (4). $M_n$=452, $M_w/M_n$=1.93.

The above mentioned Parr reactor was charged with 0.069 moles of amine-functionalized PIB (Formulae (3) and (4), 5 grams of $NaHCO_3$ as a proton trap, and 25 mL of isopropanol as solvent. The mixture was cooled down with dry ice, and 25 g (0.5 mol) of $CH_3Cl$ was added at −30° C. to the mixture. The reactor was quickly closed, and the temperature was raised to 120° C., while the pressure increased to 16 atm. During intense stirring, the reactor was kept at 120° C. for 120 h. After the reactor was vented, and opened, the product was filtered, separated and dried. The product was identified as Formulae (5) and (4).

EXAMPLE 13

A 1000-mL round bottom flask, equipped with magnetic stirrer, condenser, and dropping funnel, was charged with 77 g (0.211 mol) of TPC-535 and 100 mL of $CHCl_3$. A solution of 47 g (0.272 mol) of m-chloroperoxybenzoic acid in 600 mL of $CHCl_3$ was then added over a period of 120 minutes at 25° C. The charge was stirred for an additional 168 hours and transferred to a separatory funnel; the excess peracid was destroyed by washing with 200 mL of 10% sodium sulfite. The m-chlorobenzoic acid was extracted by washing three times each with 200 mL of 5% sodium bicarbonate and with distilled water. The organic layer was separated and dried with anhydrous $MgSO_4$; the solvent was removed by distillation on a rotavap. The final product was identified as Formula (2). The conversion of olefin to epoxy end functionality was followed by $^1$H-NMR spectroscopy following the 4.58 and 4.78 ppm resonances associated with the —C$\underline{H}$—C$\underline{H}_2$, respectively.

A 300 mL stirred Parr 452 HC T316 stainless steel reactor (Parr Instrument Company, Moline, Ill. USA) was charged with 30 g (0.08 mole) of epoxidized PIB (Formula (2)) and 75.0 g (0.96 mole) of methylamine in 40 wt % aqueous solution. After the reactor was closed, the stirring was started, and the temperature was raised to 120° C. The pressure in the reactor has reached 7.5 atm. The experiment was carried out for 120 hours. After the reactor cooled down and cautiously opened, the unreacted methylamine was evaporated, and the polymer was separated from the aqueous phase. The product was identified as Formulae (3) and (4). $M_n$=503, $M_w/M_n$=1.53.

EXAMPLE 14

A 1000-mL round bottom flask, equipped with magnetic stirrer, condenser, and dropping funnel, was charged with 94 g (0.2575 mol) of TPC-535 and 100 mL of $CHCl_3$. A solution of 58 g (0.336 mol) of m-chloroperoxybenzoic acid in 600 mL of $CHCl_3$ was then added over a period of 120 minutes at 25° C. The charge was stirred for an additional 480 hours and transferred to a separatory funnel; the excess peracid was destroyed by washing with 200 mL of 10% sodium sulfite. The m-chlorobenzoic acid was extracted by washing three times each with 200 mL of 5% sodium bicarbonate and with distilled water. The organic layer was separated and dried with anhydrous $MgSO_4$; the solvent was removed by distillation on a rotavap. The final product was identified as Formula (2). The conversion of olefin to epoxy end functionality was followed by $^1$H-NMR spectroscopy following the 4.58 and 4.78 ppm resonances associated with the —C$\underline{H}$—C$\underline{H}_2$, respectively.

EXAMPLE 15

A 1000-mL round bottom flask, equipped with magnetic stirrer, condenser, and dropping funnel, was charged with 77 g (0.211 mol) of TPC-535 and 100 mL of $CHCl_3$. A solution of 47 g (0.272 mol) of m-chloroperoxybenzoic acid in 600 mL of $CHCl_3$ was then added over a period of 120 minutes at 25° C. The charge was stirred for an additional 216 hours and transferred to a separatory funnel; the excess peracid was destroyed by washing with 200 mL of 10% sodium sulfite. The m-chlorobenzoic acid was extracted by washing three times each with 200 mL of 5% sodium bicarbonate and with distilled water. The organic layer was separated and dried with anhydrous $MgSO_4$; the solvent was removed by distillation on a rotavap. The final product was identified as Formula (2). The conversion of olefin to epoxy end functionality was followed by $^1$H-NMR spectroscopy following the 4.58 and 4.78 ppm resonances associated with the —C$\underline{H}$—C$\underline{H}_2$, respectively.

Figure 3:
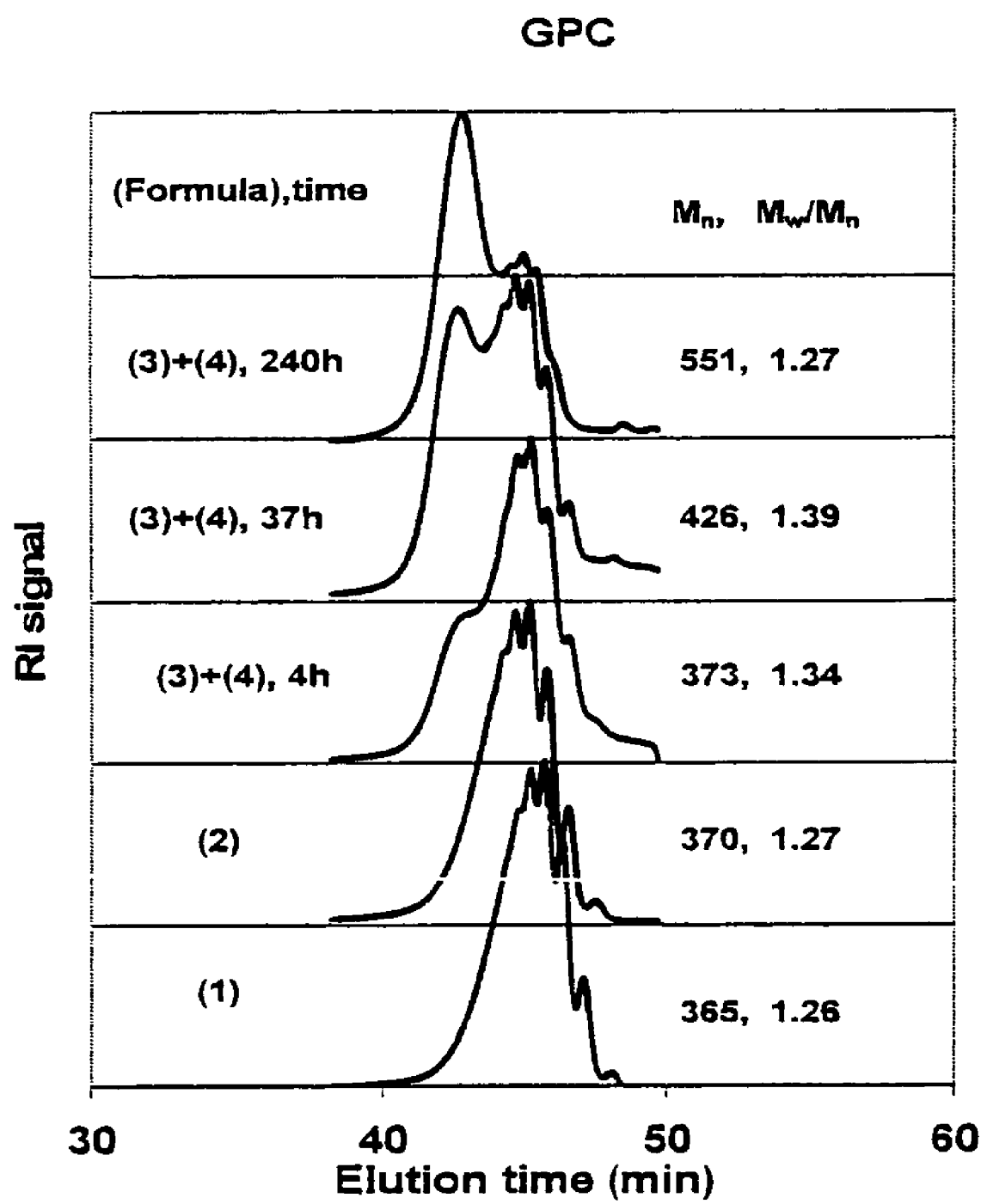
FIG. 3 is a graphical representation of conversion of polyisobutylene to amine-functionalized polyisobutylene by gel permeation chromatography.

Conversion of the polyisobutylene to the amine-functionalized polyisobutylene is illustrated by Gel Permeation Chromatography in FIG. 3.

Through characterization of the resulting amine-functionalized polyisobutylene mixture, it was determined that the polyisobutylenes of Formulae (1b) and (1c) did not take part in the reaction and maintained their original form in the final mixture. Accordingly, it is highly desirable to utilize a source of polyisobutylene having a vinylidene terminal double bond in order to produce amine-functionalized polyisobutylenes.

Amine-Functionalized Polyisobutylene Containing Compositions

The amine-functionalized polyisobutylenes can be utilized in emulsions, preferably microemulsion compositions, which advantageously can be utilized as a vehicle or automotive car wash aid, i.e., a spray wax, drying aid, and/or rinse aid. The coating compositions are typically utilized in automatic vehicle washes, but can be utilized by individual consumers at home or other locations such as self-service car washes.

Other uses include enhancing the aesthetic appearance, improving the protection, or drying the surfaces of various substrates such as vehicle, metal, plastic, painted surfaces, rubber, leather, paper, wood, glass and the like. The emulsion compositions of the present invention are formulated to overcome the environmental consequences and deficiencies of the prior art compounds, such as lack of dewatering ability, toxicity, and the like.

An important aspect of the invention involves improving the prior art hydrophobes, such as mineral seal oil, by incorporating an effective amount of the amine-functionalized polyisobutylenes disclosed in the present invention, which offer increased hydrophobicity, surface protection, and the like.

The purpose of treating car surfaces, in addition to improving their appearance, is to provide protection and to make them dry faster.

Increasing the hydrophobicity of the surfaces can attain these objectives. If a spraywax/drying agent, i.e. the emulsion or microemulsion compositions of the present invention, is sprayed onto a car's surface, the polar moiety of the cationic emulsifier contained in the formula electrostatically adheres to the polar metal surface, while the carbonaceous hydrophobic moiety protrudes away from the metal toward the air (air is a highly hydrophobic medium). The hydrophobe component of the emulsion is anchored to the surface by means of the hydrophobic moieties of the cationic emulsifier (hydrophobic attraction). The more hydrophobic the ingredient that will be in contact with the air, the more hydrophobic the surface of the car will be.

To better quantify the hydrophobicity of various drying agents and spraywaxes we have developed methodology based on contact angle measurements. Contact angles characterize the interfacial tension between a solid, a liquid, and a vapor.

When water (a high surface tension liquid) is poured onto a solid hydrophobic surface (low surface energy surface), it tends to form droplets ("beading"). This phenomenon is due to intermolecular forces. Water molecules in the interior of the liquid are surrounded by other water molecules while those at the liquid surface are attracted only from the side and from below. This uneven pull causes the molecules on the surface to draw into the body of the liquid and thus to minimize the surface area. If the solid surface is of high surface energy which exceeds the surface tension of water, (e.g. clean glass, which contains oxygen atoms having partial negative charges that attract the positive end of polar water molecules), the surface area of the water will increase and the water will wet the surface. Thus, water deposited on polar or hydrophilic surfaces will spread out, it will be flat. In contrast, water on hydrophobic surfaces will tend to assume a spherical shape.

In order to define the profiles of droplets on surfaces it is common to draw a line tangent to the curve of the droplet at the point where the droplet touches the solid. The angle formed by this line and the solid surface is called the contact angle which can be easily determined and whose value quantitatively characterizes the interaction between a liquid and a substrate. The contact angle is not a property of the liquid or the substrate, but of the interaction between the two.

Contact angles vary greatly depending on the nature of the wetting liquid and the substrate; e.g. mercury (a high surface tension liquid) on teflon (a very low surface energy solid) exhibits a contact angle of 150 degrees, while the contact angle of water on a perfectly clean glass surface is close to 0 degrees.

A common technique to measure contact angles is by the Wilhelmy plate balance (See Wilhelmy, L. "Ueber die Abhangigkeit der Capillaritats-Constanten des Alkohols von Substanz und Gestalt des benetzten festen Korpers", Ann. Physik. (1863), 119, 177-217). In this non-destructive gravimetrical test, a geometrically well-defined flat plate with a known perimeter is immersed into a liquid with a known surface tension, and a microbalance is used to measure the force the liquid exerts on the plate while the plate is submerged or is withdrawn from the liquid. The contact angle forms at the surface of the liquid where the plate emerges. The force exerted on the liquid is related to the contact angle, the wetted perimeter, and the liquid's surface tension. The Wilhelmy plate technique is simple, reliable and the wetting behavior/contact angle data can easily be correlated with surface composition or surface treatment. In our measurements we have used a Cahn DCA-312 Dynamic Contact Angle Analyzer, available from Cahn Instruments, Inc. 5225 Verona Rd. Bldg. #1, Madison Wis. 53711 USA, to determine advancing contact angles (while the plate is immersed).

FIG. 1 shows droplets of identical volumes and associated contact angles. (For simplicity, the flattening effect of gravity is neglected.) The larger the contact angle the taller are the droplets, and the smaller are the "footprint" of the droplets on the surface. If the droplet is taller, the perpendicular area to the direction of the airjet, the so-called "face area", will be larger. If the contact angle is larger, the footprint is smaller, which facilitates the removal of water by blowing it off from the surface.

The disclosed compositions of the present invention are preferably microemulsions. Microemulsions are liquid dispersions with diameters in the colloidal range generally less than 400 nm, and more preferably in the range of 20-80 nm, so that they are typically clear and transparent. These dispersions may be either oil-in-water or water-in-oil systems. One of the main advantages of microemulsions relative to conventional solutions is that they maintain and exhibit the properties of both the hydrophobe and water. The microemulsions of the present invention generally comprise a hydrophobe component, an emulsifying component, optionally but desirably a solvent component, or water, or both, and optionally other desirable additives and fillers.

An important ingredient of the compositions of the present invention is the hydrophobe component. Aliphatic straight chain, branched, chain and aromatic hydrocarbons show different affinities towards water. Branched hydrocarbons are more hydrophobic than straight chain hydrocarbons, saturated straight chain hydrocarbons are more hydrophobic than unsaturated ones, and aliphatic hydrocarbons are more hydrophobic than aromatic ones (the $\pi$-electrons of the latter cause van der Waals attraction of water molecules). The higher hydrophobicity of the branched hydrocarbons relative to the straight chain hydrocarbons is due to the larger number of water molecules in contact with the branched hydrocarbons due to their larger surface areas.

The hydrophobe component of the present invention includes an amine-functionalized polyisobutylene component as described in detail hereinabove. The amine-functionalized polyisobutylene component can comprise central, i.e. internal, or the terminal amine functionalized polyisobutylenes, or a combination thereof, with the combination being preferred. The amount of the amine-functionalized polyisobutylene component of the hydrophobe ranges generally from about 0.01 or about 0.10 to about 100 parts, desirably from about 1 to about 75, and preferably from about 5 or about 10 to about 25 or about 50 parts based on 100 parts by weight of the total hydrophobe component.

The hydrophobe component of the present invention in addition to the amine-functionalized polyisobutylenes component preferably contains a polyalkene derived from alkene repeat groups having from 3 to about 10 carbon atoms with a polyisobutylene component being highly preferred. The polyisobutylene components utilized in this invention include, but are not limited to, polyisobutylenes, polybutenes, polyisobutylene derivatives, isobutylene copolymers such as isobutylene/butene containing less than 50% and preferably less than 10% of hydrocarbon comonomer units such as styrene, substituted styrenes such as alphamethylstyrene, and the like; ethylene, propylene; butadiene, isoprene, pyperylene, etc., and blends thereof. The polyisobutylene derivatives utilized in the present invention can contain various end groups, including saturated or unsaturated end groups with examples including, but not limited to, at least a methylpropenyl, halide, chlorosilyl, hydroxyl, amino, amido, cyano, vinyl, epoxy, carboxyl, ester, and succinic anhydride, and the like, or combinations thereof. The polyisobutylene derivatives can also include a moiety derived from an aliphatic or aromatic initiator residue.

The polyisobutylene component of the present invention generally has a number average molecular weight of from about 100 to about 3,000, desirably between about 150 to about 1,000, and preferably from about 200 to about 600.

In addition to the amine-functionalized polyisobutylenes and polyisobutylene component, the hydrophobe component can also optionally contain other non-polyisobutylene hydrophobes such as mineral seal oil, paraffinic or naphtenic mineral oil, vegetable oil, fuel oil, diesel oil, petroleum naphta grease, ester, fat, synthetic or natural wax, aliphatic and aromatic hydrocarbon, or a polymer such as, low molecular weight polypropylene, polyvinyl chloride, various fluoropolymers, various polysiloxanes, and the like, as well as combinations thereof. The amount of polyisobutylene component (non amine-functionalized polyisobutylenes) of the hydrophobe ranges generally from about 0.001, 0.05, 0.1, 0.5, 1, 2, 3, 4, 5, or 10 to about 99.99 parts by weight, desirably from about 10 or 25 to about 90 or 99.90 parts by weight, and preferably from about 40 or 50 to about 60, or 75, or 90, or 99.90 parts by weight, based on 100 parts by weight of the total hydrophobe component.

The hydrophobic microemulsions can be effectively used even if the hydrophobic component contains only less than about 1% of amine-functionalized polyisobutylenes, polyisobutylene or derivatives thereof, etc., as set forth above and an excess of other suitable polyhydrocarbons such as polypropylene, polyethylene, ethylene-propylene copolymers, polybutene-1, polypentene-1, and the like. It is however recognized, that good hydrophobicity is attained by the use of large quantities of amine-functionalized polyisobutylene, polyisobutylenes, its derivatives, etc.

Low molecular weight liquid polyisobutylene (PIB) or isobutylene-butene copolymers and amine-functionalized polyisobutylenes are highly hydrophobic and impermeable to water or gases, chemically inert, and transparent. They provide superior color stability on long exposure to ultraviolet light, (much more so than conventional mineral oils) and exhibit outstanding resistance to oxidation. These characteristics are especially important when comparing the behavior of PIB to natural waxes. The surfaces of natural waxes (esters of fatty acids and monohydroxy alcohols) are oxidized when exposed to UV light and/or oxygen; thus water will bead up less, because the surface is less hydrophobic. Furthermore polyisobutylenes are nontoxic, and meet U.S. FDA specifications for use in food contact applications.

The emulsion compositions of the present invention also, optionally, but desirably contain an emulsifying component which is responsible for plating the hydrophobe onto the desired surface. Such emulsifiers can generally be any cationic surfactant such as a quaternary ammonium salt or an ethoxylated amine; or a nonionic surfactant, or an amphoteric surfactant, and the like. The emulsifier component can be one emulsifier or a blend of various emulsifiers. Preferably, at least one of the emulsifiers should be cationic.

Suitable cationic emulsifiers include dicoco dimethyl ammonium chloride; ditallow dimethyl ammonium chloride; ester-based quaternary salts, or amido or diamido amine quaternary salts, various di-quaternary salts, and various ethoxylated quaternary salts. Other suitable cationic emulsifiers include ether amine quaternaries such as isodecyloxypropyl bis-[2-hydroxyethyl]methyl ammonium chloride available from Exxon Chemicals, Tomah Products Division of Milton, Wis. under the designation Q-14-2, and isotridecyloxypropyl dihydroxyethyl methyl ammonium chloride, available from Exxon Chemicals, Tomah Products Division, of Milton, Wis. under the designation Q-17-2. Another group of cationic emulsifiers include various fatty amine salts; imidazolines (oleyl, coco, tall oil, and lauric, imidazoline, etc.) and salts thereof; imidoamine salts; amine acetates; diamine diacetates; amine oxides; and the like, as well as combinations thereof. These and other cationic emulsifiers which can be utilized are set forth in Cationic Surfactants, Eric Jungermann, Marcel Dekker Inc. New York, N.Y., ISBN 0-8247-7199-0, 1969, which is hereby fully incorporated by reference.

Suitable nonionic surfactants/cosurfactants include, but are not limited to, fatty alcohols, polyethylene glycol ethers, oxo-alcohol polyethyleneglycol ethers, alkylphenol polyethyleneglycol ethers, fatty acid alkanol amides, fatty alcohol polyglycol ethers (EO/PO-Adducts), ethylene oxide/propylene oxide block polymers, ethoxylated amines, ethoxylated diamines, or alkyl dimethyl amine oxides, and combinations thereof.

The amphoteric emulsifiers include those known to the art and to the literature such as the various alkylamino butyric acids.

The emulsifiers can be used in an amount generally from about 1 to about 500, desirably from about 10 to about 200, and preferably from about 50 to about 150 parts by weight based on 100 parts by weight of the hydrophobe component.

The emulsion compositions of the present invention preferably include at least one solvent, which is used to aid emulsifying of incompatible fluids, i.e. the hydrocarbon component and water. The use of a solvent also prevents thickening and gelation when the emulsion is diluted with water. Such gelation can cause problems in automatic carwashes when it is desired to inject a concentrated spray wax or drying aid into a rinse water stream or even when just mixing a concentrate with water in a tank. Examples of suitable solvents include but are not limited to glycol ethers having a total of from 2 to about 20 carbon atoms and desirably from 5 to about 10 carbon atoms such as ethylene glycol n-butyl ether, dipropylene glycol methyl ether, diethylene glycol methyl ether, propylene glycol methyl ether, tripropylene glycol methyl ether, propylene glycol methyl ether acetate, dipropylene glycol methyl ether acetate, propylene glycol n-butyl ether, dipropylene glycol n-butyl ether, tripropylene glycol n-butyl ether, propylene glycol phenyl ether, propylene glycol n-propyl ether, triethylene glycol butyl ether/highers, triethylene glycol methyl ether/highers, ethylene glycol phenyl ether, and aromatic based glycol ether, and the like. Preferred glycol ethers include dipropylene glycol methyl ether, propylene glycol n-butyl ether and ethylene glycol n-butyl ether. Another group of suitable solvents are the various alcohols having from 1 to about 20 carbon atoms such as methyl alcohol, ethyl alcohol, propyl alcohol, isopropyl alcohol, butyl alcohol, isobutyl alcohol, amyl alcohol, and the like. The solvent utilized in the present invention ranges generally from about 0.1 to about 200 parts by weight, desirably from about 1.0 to about 50 parts by weight, and preferably from about 2 to about 20 parts by weight based on 100 parts by weight of the hydrophobe component utilized in the present invention.

Typically, emulsion compositions of the present invention are diluted with water. The water can be unsoftened, softened, distilled, ion exchanged, R.O. (reverse osmosis) water and the like. Water may not be utilized as when shipping a concentrate. However, when utilized, the amount thereof can vary widely depending upon the desired concentration, such as from about 1 to about 1 million or 10 million, and desirably from about 100 to about 100,000 parts by weight per 100 total parts by weight of the hydrophobe component.

In addition to these components, a variety of nonessential components, which are not critical to the performance, but may be advantageous in some applications, can be added. These materials include but are not restricted to rust inhibitors, dyes, UV absorbers, antifoam agents, antimicrobial agents, fragrances, sequestring agents, thickening agents, stabilizers, etc. These additional components when utilized each can be in any desired or effective amount such as generally from about 0.1 to about 100 or 200 parts by weight per 100 parts by weight of the hydrophobe component.

Water droplets on car surfaces ("beaded water") are commonly removed by a blower in an automated car wash. The shape of the water droplets is determined by the contact angle (see above).

FIG. 1 shows droplets of identical volumes and associated contact angles. (For simplicity, the flattening effect of gravity is neglected.) The larger the contact angle the taller are the droplets, and the smaller are the "footprint" of the droplets on the surface. If the droplet is taller, the perpendicular area to the direction of the airjet, the so-called "face area", will be larger. If the contact angle is larger, the footprint is smaller, which facilitates the removal of water by blowing it off from the surface.

Figure 4:
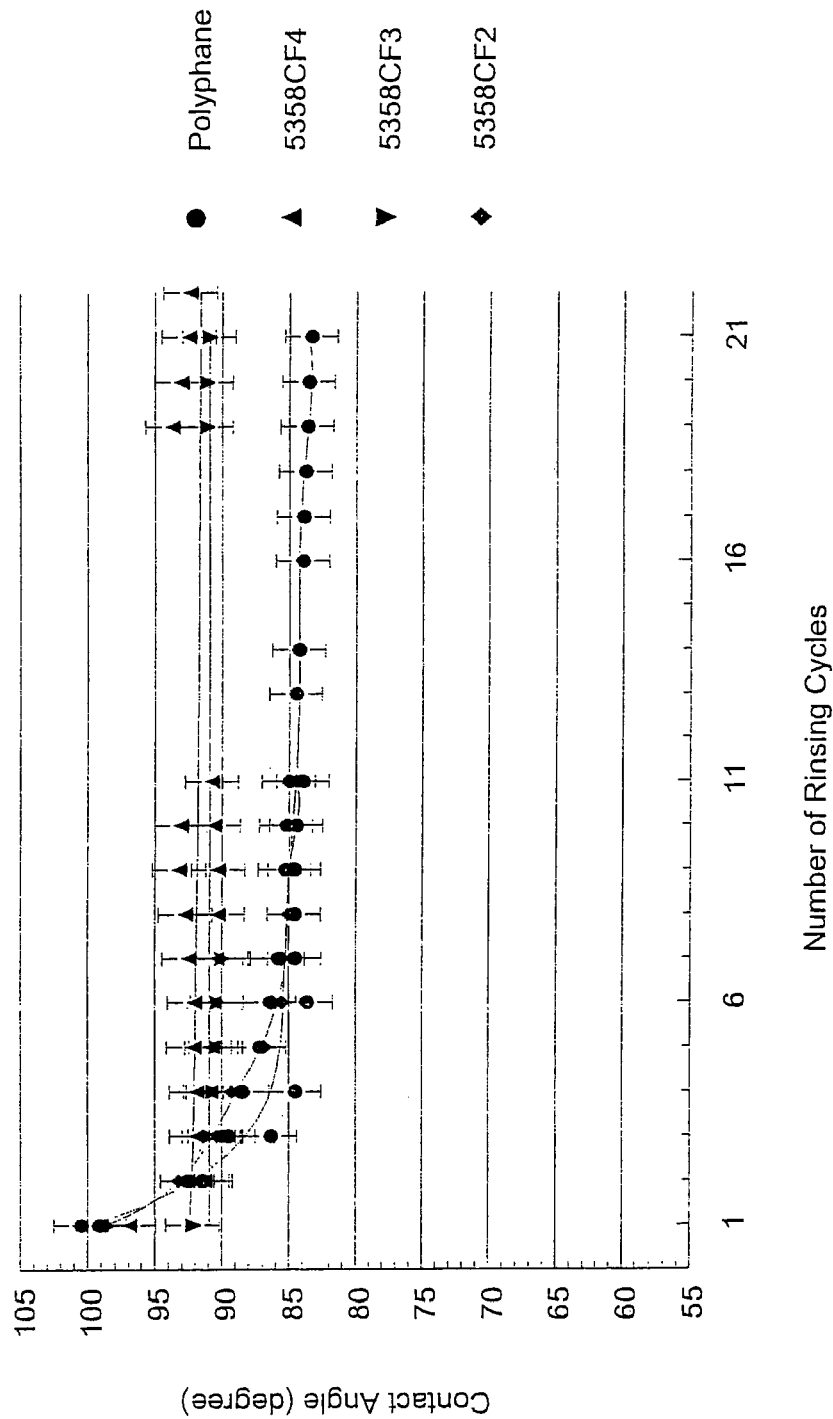
FIG. 4 illustrates emulsion durability by a plot of contact angle vs. number of rinsing cycles.

The initial advancing contact angle of compositions of the present invention which include the amine-functionalized polyisobutylenes when measured in a manner as set forth herein below is generally at least about 90, desirably at least about 91, and preferably at least about 92 degrees. The compositions unexpectedly maintain greater contact angles than prior art compositions after a plurality of rinsing cycles as indicated in FIG. 4. Accordingly, the durability of the present invention compositions is excellent.

Figure 2:
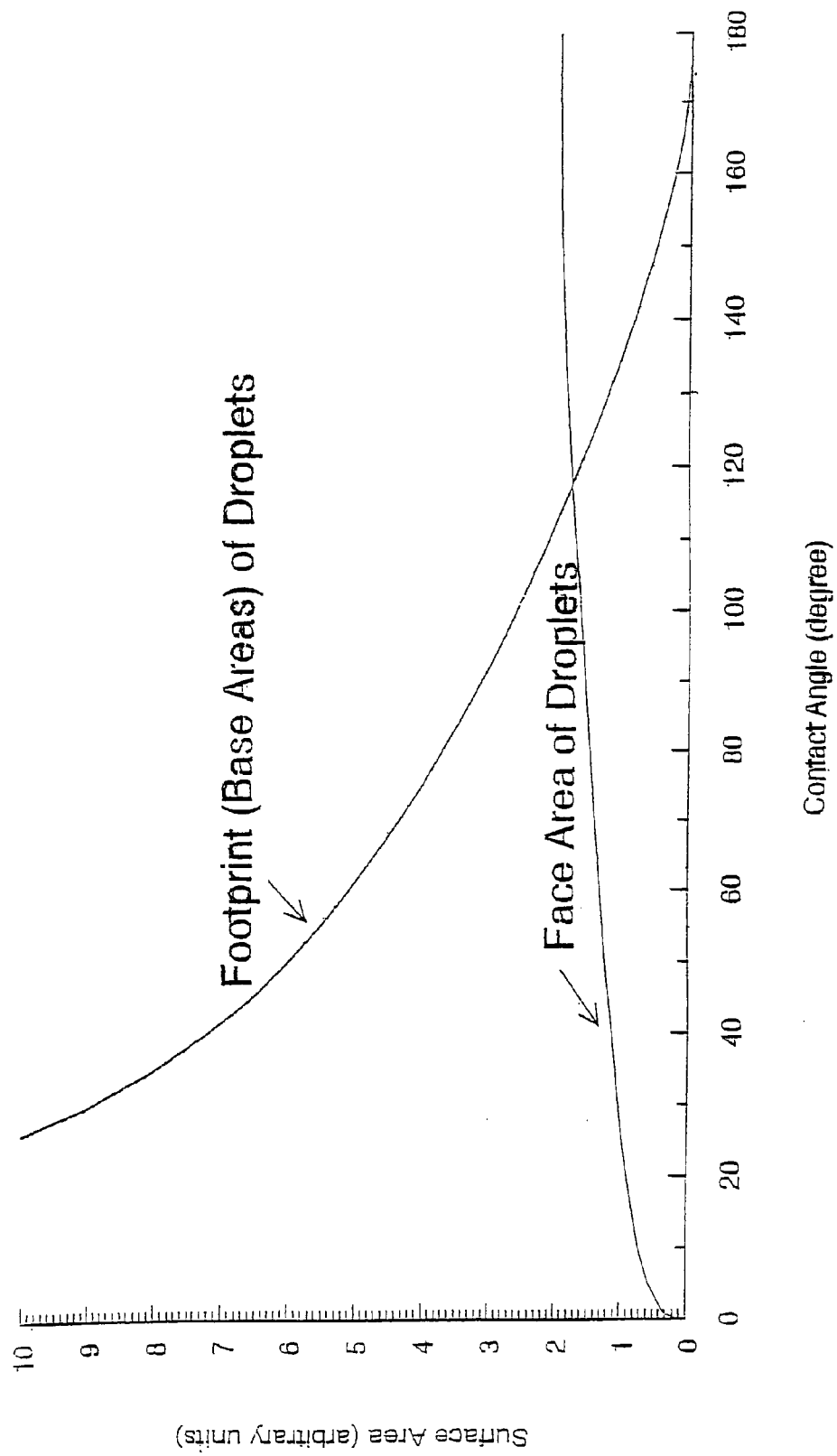
FIG. 2 illustrates footprints and face areas of droplets as a function of contact angles.

FIG. 2 shows the correlation between footprints (in arbitrary units) and contact angles. The airjet of the blower can more easily "grab" droplets with smaller footprints (less contact with the surface) and larger face areas (a larger force can be exerted by the air). For example, increasing the contact angle by about 10% (e.g. from 90 to 100 degree), the footprint area decreases by 20%, and the face area increases by 4.5%. This increase in the contact angle results in a 25% (1.2.×1.045=1.25) improvement in the efficiency of the drying (dewatering) step. Thus, increasing the contact angle at the surface of the car is desirable. We have found that the contact angle can be increased by hydrophobizing surfaces utilizing compositions including the amine-functionalized polyisobutylenes of the present invention.

The following examples serve to illustrate amine-functionalized polyisobutylene compositions, but not to limit, the present invention.

Emulsion Composition Examples

Results Of Contact Angle Measurements

Various microemulsion compositions were prepared for contact angle measurements, see Table I. In these formulas, dicoco-dimethyl ammonium chloride was the cationic emulsifying agent, dipropylene glycol methyl ether was the first solvent, and isopropanol was the second solvent. The hydrophobe was polyisobutylene from BP Amoco. The amine-functionalized polyisobutylene utilized was prepared in Example 9 disclosed hereinabove. As shown in Table I below, the control formulation Experiment 1 contained no amine-functionalized polyisobutylene. Table II lists the contact angles obtained as a function of number of rinsing cycles for the various compositions of Table I. FIG. 4 illustrates in chart form the contact angle measurements with respect to an increasing number of rinsing cycles. As indicated from the examples, the greater the amount of amine-functionalized polyisobutylene contained in the formulations, the greater the contact angle after a plurality of rinsing cycles. Thus, the amine-functionalized polyisobutylenes formulas have superior durability when compared to prior art compositions.

TABLE I

MICROEMULSIONS WITH AMINE-FUNCTIONALIZED POLYISOBUTYLENES

| | Experiment | | | | | | | |
|---|---|---|---|---|---|---|---|---|
| | 1 (Control) Weight | | 2 Weight | | 3 Weight | | 4 Weight | |
| Components | g | w % | g | w % | g | w % | g | w % |
| Hydrophobe | 26.48 | 11.77 | 52.96 | 11.65 | 11.17 | 11.18 | 20.00 | 8.62 |
| Solvent 1 | 5.92 | 2.63 | 11.85 | 2.61 | 2.50 | 2.50 | 9.42 | 4.06 |
| Solvent 2 | 0.00 | 0.00 | 0.00 | 0.00 | 2.50 | 2.50 | 3.50 | 1.51 |
| Emulsifier (80% active) | 29.17 | 12.97 | 58.34 | 12.83 | 12.31 | 12.32 | 25.60 | 11.04 |
| PIB Amine | 0.00 | 0.00 | 4.70 | 1.03 | 2.50 | 2.50 | 10.00 | 4.31 |
| Water | 163.40 | 72.63 | 326.80 | 71.88 | 68.97 | 69.00 | 163.40 | 70.46 |
| Total: | 224.97 | 100.00 | 454.65 | 100.00 | 99.95 | 100.00 | 231.92 | 100.00 |

TABLE II

| | Contact Angles as a Function of Number of Rinsing Cycles | | | | | | | | | |
|---|---|---|---|---|---|---|---|---|---|---|
| | Cycles | | | | | | | | | |
| | 1 | 2 | 3 | 4 | 5 | 6 | 7 | 8 | 9 | 10 |
| Experiment 1 | 100.50 | 92.57 | 89.55 | 88.51 | 87.25 | 86.47 | 85.85 | | 85.37 | 85.27 |
| | 99.16 | 91.46 | 86.42 | 84.59 | | 83.72 | 84.61 | 84.65 | 84.63 | 84.52 |
| Ave.: | 99.83 | 92.02 | 87.99 | 86.55 | 87.25 | 85.10 | 85.23 | 84.65 | 85.00 | 84.90 |
| Experiment 2 | 98.73 | 93.28 | 90.41 | 89.29 | 86.95 | 85.63 | 85.60 | 85.16 | 84.85 | 84.56 |
| Experiment 3 | 92.17 | 91.18 | 90.96 | 90.65 | 90.43 | 90.36 | 90.01 | | | |
| Experiment 4 | 96.93 | 91.28 | 90.54 | 90.82 | 90.77 | 90.58 | 90.38 | 90.32 | 90.28 | 90.60 |
| | | 92.58 | 91.92 | 91.89 | 92.12 | 92.05 | 92.46 | 92.74 | 93.22 | 93.10 |
| Ave.: | 96.93 | 91.93 | 91.23 | 91.36 | 91.45 | 91.32 | 91.42 | 91.53 | 91.75 | 91.85 |
| | Cycles | | | | | | | | | |
| | 11 | 13 | 14 | 16 | 17 | 18 | 19 | 20 | 21 | 22 |
| Experiment 1 | 85.08 | | | | | | | | | |
| | 84.02 | 84.55 | 84.33 | 84.05 | 83.99 | 83.84 | 83.69 | 83.60 | 83.42 | |
| Ave.: | 84.55 | 84.55 | 84.33 | 84.05 | 83.99 | 83.84 | 83.69 | 83.60 | 83.42 | |
| Experiment 2 | 84.51 | | | | | | | | | |
| Experiment 3 | | | | | | | 91.18 | 91.19 | 90.99 | |
| Experiment 4 | 90.77 | | | | | | | | | |
| | | | | | | | 93.71 | 93.07 | 92.51 | 92.41 |
| Ave.: | 90.77 | | | | | | 93.71 | 93.07 | 92.51 | 92.41 |

Table II and FIG. 4 show that compositions of the present invention including amine-functionalized polyisobutylenes are highly durable and maintain higher contact angles as the number of rinsing cycles increases when compared to the prior art compositions without amine-functionalized polyisobutylenes. In view of the fact that the contact angles hardly decrease with an increased number of rinsing cycles, the surface or substrate to which the compositions are applied are thus protected for longer periods of time.

In accordance with the patent statutes, the best mode and preferred embodiment have been set forth, the scope of the invention is not limited thereto, but rather by the scope of the attached claims.

What is claimed is:

1. An amine-functionalized polyisobutylene derivative, comprising:
a compound having the formula:

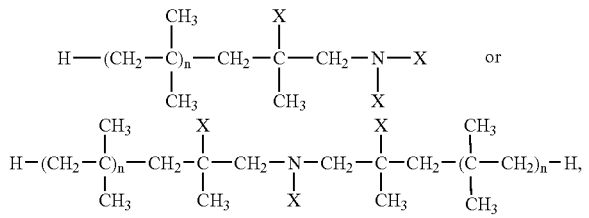

or both, wherein each n, independently, is from 1 to about 100, and wherein each X, independently is H; or an alkyl group having from 1 to 10 carbon atoms; and wherein each X not connected to the nitrogen atom, independently, is —OR, where R is an alkyl group having from 1 to 5 carbon atoms.

2. The amine-functionalized polyisobutylene derivative according to claim 1, wherein each n is from 1 to about 10.

3. The amine-functionalized polyisobutylene derivative according to claim 2, wherein each X connected to the nitrogen atom, independently, is an alkyl group having from 1 to 5 carbon atoms.

4. The amine-functionalized polyisobutylene derivative according to claim 3, wherein each X not connected to the nitrogen atom is a methyl ether group, and wherein each X connected to the nitrogen atom is a methyl group.

5. A hydrophobizing microemulsion, comprising:
a hydrophobe component,
an emulsifying component; and
a component selected from the group consisting of water, solvent and mixtures thereof;
said hydrophobe component comprising from about 0.01 to about 100 parts of an amine-functionalized polyisobutylene per 100 parts by weight of the hydrophobe component,
said amine-functionalized polyisobutylene having the formula:

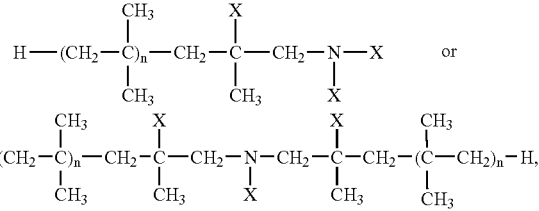

or both, wherein each n, independently, is from 1 to about 100, and wherein each X, independently is H; or an alkyl group having from 1 to 10 carbon atoms; and wherein each X not connected to the nitrogen atom, independently, is —OR, where R is an alkyl group having from 1 to 5 carbon atoms.

6. The microemulsion according to claim 5, wherein said emulsifying component is present in an amount from about 1 to about 500 parts per 100 parts by weight of the hydrophobe, said emulsifying component comprising at least a cationic quaternary ammonium salt.

7. The microemulsion according to claim 6, wherein said hydrophobe component further comprises a polyalkylene derived from repeat groups having from 3 to 10 carbon atoms in an amount from about 0.1 to about 99.90 parts by weight of the hydrophobe component.

8. The microemulsion according to claim 7, wherein said polyalkene comprises a polyisobutylene component having a number average molecular weight from about 100 to about 3000, wherein said polyisobutylene component is present in an amount from about 1 to about 99.90 parts by weight per 100 parts by weight of the hydrophobe component.

9. The microemulsion according to claim 8, wherein the amount of said quaternary ammonium salt is from about 10 to about 200 parts by weight per 100 parts by weight of said hydrophobe component, and wherein said microemulsion has a colloidal diameter of less than 400 nm.

10. The microemulsion according to claim 9, wherein said quaternary ammonium salt is dicoco dimethyl ammonium chloride, ditallow dimethyl ammonium chloride, isodecyloxypropyl bis-[2-hydroxyethyl]methyl ammonium chloride, or isotridecyloxypropyl dihydroxyethyl methyl ammonium chloride, or combinations thereof.

11. The microemulsion according to claim 7, wherein each n is from 1 to about 10.

12. The microemulsion according to claim 11, wherein each X connected to the nitrogen atom, independently, is an alkyl group having from 1 to 5 carbon atoms.

13. The microemulsion according to claim 12, wherein each X not connected to the nitrogen atom is a methyl ether group, and wherein each X connected to the nitrogen atom is a methyl group.

14. The microemulsion according to claim 5, including said solvent, and wherein said emulsifying component optionally comprises a nonionic emulsifier, an amphoteric emulsifier, or combinations thereof.

15. The microemulsion according to claim 14, wherein said solvent is a glycol ether having a total of from 2 to 20 carbon atoms, or an alcohol having a total of from 1 to 20 carbon atoms, or combinations thereof, and wherein the amount of said solvent is from about 0.1 to about 200 parts by weight per 100 parts by weight of said hydrophobe component.

16. The microemulsion according to claim 15, wherein said amine-functionalized polyisobutylene component is present in an amount from 1 to about 75 parts per 100 parts by weight of the hydrophobe component, and wherein the amount of said solvent is from about 1 to about 50 parts by weight per 100 parts by weight of said hydrophobe component.

17. The microemulsion according to claim 16, wherein said solvent is dipropylene glycol methyl ether, propylene glycol, n-butyl ether, or ethylene glycol n-butyl ether, isopropanol, or combinations thereof, wherein said microemulsion includes said water, and wherein said hydrophobe component also comprises mineral seal oil.

18. The microemulsion according to claim 17, wherein said microemulsion has a colloidal diameter range of about 20 to about 80 nanometers.

19. The microemulsion according to claim 16, wherein each n is from 1 to about 10.

20. The microemulsion according to claim 19, wherein each X not connected to the nitrogen atom is a methyl ether group, and wherein each X connected to the nitrogen atom is a methyl group.

21. The microemulsion according to claim 5, including said water.

22. A hydrophobizing microemulsion, comprising:
a hydrophobe component, an emulsifying component, water, and a solvent, said hydrophobe component comprising an amine-functionalized polyisobutylene component in an amount from about 0.1 to about 100 parts by weight per 100 parts by weight of the hydrophobe component, said amine-functionalized polyisobutylene having the formula:

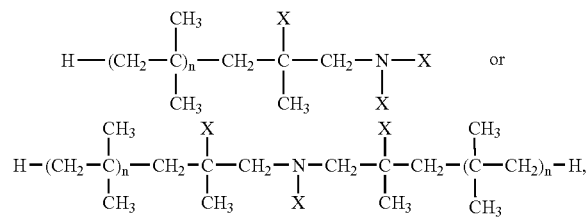

or both, wherein each n, independently, is from 1 to about 100, and wherein each X, independently is H; or an alkyl group having from 1 to 10 carbon atoms; and wherein each X not connected to the nitrogen atom, independently, is —OR, where R is an alkyl group having from 1 to 5 carbon atoms.

23. The microemulsion according to claim 22, wherein said emulsifying component comprises at least a cationic quaternary ammonium salt in an amount from about 10 to about 500 parts by weight per 100 parts by weight of the hydrophobe component, and wherein said emulsifying component optionally comprises a nonionic emulsifier, an amphoteric emulsifier, or combinations thereof.

24. The microemulsion according to claim 23, wherein the emulsion has an advancing contact angle of at least about 90 degrees after five rinsing cycles.

25. The microemulsion according to claim 23, wherein said solvent is a glycol ether having a total of from 2 to 20 carbon atoms, or an alcohol having from about 1 to 20 carbon atoms, or combinations thereof.

26. The microemulsion according to claim 25, wherein said solvent is dipropylene glycol methyl ether, propylene glycol n-butyl ether, or ethylene glycol n-butyl ether, isopropanol, or combinations thereof.

27. The microemulsion according to claim 25, wherein each n is from 1 to about 10.

28. The microemulsion according to claim 27, wherein each X connected to the nitrogen atom, independently, is an alkyl group having from 1 to 5 carbon atoms.

29. The microemulsion according to claim 28, wherein each X not connected to the nitrogen atom is a methyl ether group, and wherein each X connected to the nitrogen atom is a methyl group.

30. The microemulsion according to claim 29, wherein said hydrophobe component further comprises a polyalkylene derived from repeat groups having from 3 to 10 carbon atoms in an amount from about 0.1 to about 99.90 parts by weight of the hydrophobe component.

31. The microemulsion according to claim 30, wherein said quaternary ammonium salt is dicoco dimethyl ammonium chloride, ditallow dimethyl ammonium chloride, isodecyloxypropyl bis-[2-hydroxyethyl]methyl ammonium chloride, or isotridecyloxypropyl dihydroxyethyl methyl ammonium chloride, or combinations thereof, wherein said amine-functionalized polyisobutylene component is present in an amount from 1 to about 75 parts per 100 parts by weight of the hydrophobe component, wherein the amount of said solvent is from about 1 to about 50 parts by weight per 100 parts by weight of said hydrophobe component, wherein said solvent is dipropylene glycol methyl ether, propylene glycol, n-butyl ether, or ethylene glycol n-butyl ether, isopropanol, or combinations thereof, and wherein said hydrophobe component also comprises mineral seal oil.

32. The microemulsion according to claim 27, wherein said hydrophobe component further comprises a polyalkylene derived from repeat groups having from 3 to 10 carbon atoms in an amount from about 0.1 to about 99.90 parts by weight of the hydrophobe component.

33. The microemulsion according to claim 32, wherein said polyalkene comprises a polyisobutylene component having a number average molecular weight from about 100 to about 3000, wherein said polyisobutylene component is present in an amount from about 1 to about 99.90 parts by weight per 100 parts by weight of the hydrophobe component, wherein the amount of said quaternary ammonium salt is from about 10 to about 200 parts by weight per 100 parts by weight of said hydrophobe component, and wherein said microemulsion has a colloidal diameter of less than 400 nm.

34. The microemulsion according to claim 33, wherein said quaternary ammonium salt is dicoco dimethyl ammonium chloride, ditallow dimethyl ammonium chloride, isodecyloxypropyl bis-[2-hydroxyethyl]methyl ammonium chloride, or isotridecyloxypropyl dihydroxyethyl methyl ammonium chloride, or combinations thereof, wherein said amine-functionalized polyisobutylene component is present in an amount from 1 to about 75 parts per 100 parts by weight of the hydrophobe component, and wherein the amount of said solvent is from about 1 to about 50 parts by weight per 100 parts by weight of said hydrophobe component.

35. The microemulsion according to claim 34, wherein said solvent is dipropylene glycol methyl ether, propylene glycol, n-butyl ether, or ethylene glycol n-butyl ether, isopropanol, or combinations thereof, and wherein said hydrophobe component also comprises mineral seal oil.

* * * * *